United States Patent
Tarlazzi et al.

(10) Patent No.: US 10,375,587 B2
(45) Date of Patent: Aug. 6, 2019

(54) JOINT OPTIMIZATION OF A RADIO ACCESS NETWORK AND A DISTRIBUTED ANTENNA SYSTEM

(71) Applicant: CommScope Technologies LLC, Hickory, NC (US)

(72) Inventors: Luigi Tarlazzi, Bagnacavallo (IT); Maurice D'Souza, Plano, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/160,870

(22) Filed: Oct. 15, 2018

(65) Prior Publication Data

US 2019/0053075 A1     Feb. 14, 2019

Related U.S. Application Data

(63) Continuation of application No. 15/811,445, filed on Nov. 13, 2017, now Pat. No. 10,104,558, which is a (Continued)

(51) Int. Cl.
*H04W 24/02* (2009.01)
*H04W 52/38* (2009.01)
(Continued)

(52) U.S. Cl.
CPC ............ *H04W 24/02* (2013.01); *H04B 17/19* (2015.01); *H04W 52/143* (2013.01);
(Continued)

(58) Field of Classification Search
CPC ..... H04W 24/02; H04W 24/08; H04W 52/42; H04W 52/143; H04W 52/386; H04W 84/18; H04B 17/19
See application file for complete search history.

(56) References Cited

U.S. PATENT DOCUMENTS 7,286,507 B1 * 10/2007 Oh ........................ H04W 16/26
                                                              370/312
7,480,486 B1 *  1/2009 Oh ........................ H04B 7/1555
                                                              370/315
(Continued)

FOREIGN PATENT DOCUMENTS

WO        2014014689 A1    1/2014

OTHER PUBLICATIONS

"3rd Generation Partnership Project; Technical Specification Group Radio Access Network; Evolved Universal Terrestrial Radio Access Network (E-UTRAN); Self-configuring and self-optimizing network (SON) use cases and solutions (Release 9)", 3rd Generation Partnership Project, 2011, pp. 1-21, 3GPP Organizational Partners.
(Continued)

*Primary Examiner* — Dominic E Rego
(74) *Attorney, Agent, or Firm* — Fogg & Powers LLC

(57) ABSTRACT

Certain features relate to systems and methods for jointly optimizing a radio access network (RAN) and distributed antenna system (DAS). A joint RAN-DAS self-optimizing network (SON) entity can determine target parameters based on parameters specific to the DAS and parameters specific to the RAN. The joint RAN-DAS-SON entity can optimize the RAN and DAS using the target parameters. Jointly optimizing the RAN and the DAS can improve the capacity characteristics, coverage characteristics, or the performance characteristics of the RAN and DAS. In some aspects, the joint RAN-DAS-SON entity can optimize the RAN and DAS by re-allocating power levels of downlink signals transmitted by remote units of the DAS to compensate for underutilized carrier signals in situations of low traffic load.

20 Claims, 4 Drawing Sheets

Related U.S. Application Data continuation of application No. 15/431,263, filed on Feb. 13, 2017, now Pat. No. 9,820,172, which is a continuation of application No. 14/760,402, filed as application No. PCT/US2015/015999 on Feb. 16, 2015, now Pat. No. 9,572,051.

(60) Provisional application No. 61/942,800, filed on Feb. 21, 2014.

(51) Int. Cl.
*H04B 17/19* (2015.01)
*H04W 52/42* (2009.01)
*H04W 52/14* (2009.01)
*H04W 24/08* (2009.01)
*H04W 84/18* (2009.01)

(52) U.S. Cl.
CPC ......... *H04W 52/386* (2013.01); *H04W 52/42* (2013.01); *H04W 24/08* (2013.01); *H04W 84/18* (2013.01)

(56) References Cited

U.S. PATENT DOCUMENTS

| | | | |
|---|---|---|---|
| 7,848,731 | B1 | 12/2010 | Dianda et al. |
| 8,406,759 | B2 | 3/2013 | Ryan et al. |
| 8,457,631 | B2 | 6/2013 | Choksi et al. |
| 8,532,580 | B2 | 9/2013 | Elliott et al. |
| 8,583,182 | B2 | 11/2013 | Piirainen et al. |
| 8,599,794 | B2 | 12/2013 | Ahmadi |
| 8,620,302 | B2 | 12/2013 | Gunnarsson et al. |
| 2006/0056448 | A1 | 3/2006 | Zaki et al. |
| 2008/0199183 | A1 | 8/2008 | Liu et al. |
| 2008/0274735 | A1* | 11/2008 | Choksi ............... H04L 65/1073 455/432.2 |
| 2009/0036116 | A1 | 2/2009 | Kim et al. |
| 2011/0105185 | A1 | 5/2011 | Heald |
| 2011/0268033 | A1 | 11/2011 | Boldi et al. |
| 2012/0057572 | A1* | 3/2012 | Evans ................. H04W 88/085 370/338 |
| 2012/0196591 | A1 | 8/2012 | O'Keeffe et al. |
| 2013/0031036 | A1 | 1/2013 | Kojima |
| 2013/0040683 | A1 | 2/2013 | Siomina et al. |
| 2013/0051278 | A1 | 2/2013 | Watkins et al. |
| 2013/0071112 | A1 | 3/2013 | Melester et al. |
| 2013/0170347 | A1 | 7/2013 | Zhang et al. |
| 2013/0170362 | A1 | 7/2013 | Futaki et al. |
| 2013/0189941 | A1 | 7/2013 | Abbott et al. |
| 2013/0194961 | A1 | 8/2013 | Kang et al. |
| 2013/0201916 | A1 | 8/2013 | Kummetz et al. |
| 2013/0225216 | A1 | 8/2013 | Calin et al. |
| 2013/0331079 | A1 | 12/2013 | Rácz et al. |
| 2014/0031049 | A1 | 1/2014 | Sundaresan et al. |
| 2014/0094159 | A1 | 4/2014 | Raleigh et al. |
| 2014/0119312 | A1 | 5/2014 | Doetsch et al. |
| 2014/0198684 | A1 | 7/2014 | Gravely et al. |
| 2014/0242999 | A1 | 8/2014 | Goshen |
| 2015/0078303 | A1 | 3/2015 | Jöngren et al. |
| 2015/0310964 | A1 | 10/2015 | Larson et al. |
| 2016/0057648 | A1 | 2/2016 | Franza et al. |

OTHER PUBLICATIONS

4G Americas, "Self-Optimizing Networks in 3GPP Release 11: The Benefits of SON in LTE", Oct. 2013, pp. 1-62.
4G Americas, "Self-Optimizing Networks: The Benefits of SON in LTE", Jul. 2011, pp. 1-69.
European Patent Office, "Communication pursuant to Article 94(3) from EP Application No. 15751423.3 dated Nov. 8, 2018", from Foreign Counterpart to U.S. Appl. No. 14/760,402, dated Nov. 8, 2018, pp. 1-7, Published: EP.
European Patent Office, "Extended European Search Report from EP Application No. 15751423.3 dated Sep. 25, 2017", from Foreign Counterpart to U.S. Appl. No. 14/760,402, dated Sep. 25, 2017, pp. 1-9, Published: EP.
International Searching Authority, "International Search Report and the Written Opinion of the International Searching Authority from PCT Application No. PCT/US2015/015999 dated May 28, 2015", from Foreign Counterpart to U.S. Appl. No. 14/760,402, dated May 28, 2015, pp. 1-9, Published: KR.
U.S. Patent and Trademark Office, "Office Action", U.S. Appl. No. 15/431,263, dated Mar. 22, 2017, pp. 1-11, Published: US.
U.S. Patent and Trademark Office, "Notice of Allowance", U.S. Appl. No. 14/760,402, dated Sep. 30, 2016, pp. 1-12, Published: US.
U.S. Patent and Trademark Office, "Notice of Allowance", U.S. Appl. No. 15/431,263, dated Jul. 12, 2017, pp. 1-7, Published: US.
U.S. Patent and Trademark Office, "Notice of Allowance", U.S. Appl. No. 15/811,445, dated Jun. 8, 2018, p. 1-14, Published: US.

\* cited by examiner

FIG. 4A

| MAX BTS POWER = 43dBm (ONE BTS PER CARRIER) | CARRIER 1 | CARRIER 2 | CARRIER 3 | CARRIER 4 |
|---|---|---|---|---|
| POWER PER CARRIER [dBm] INITIAL EQUAL POWER ALLOCATION | 43 | 43 | 43 | 43 |
| POWER PER CARRIER [dBm] NO LOAD CONDITION ON CARRIER 1 | 33 | 43 | 43 | 43 |

FIG. 4B

| MAX RU POWER = 30dBm | CARRIER 1 | CARRIER 2 | CARRIER 3 | CARRIER 4 |
|---|---|---|---|---|
| POWER PER CARRIER [dBm] INITIAL EQUAL POWER ALLOCATION | 24 DL GAIN=-19dB | 24 DL GAIN=-19dB | 24 DL GAIN=-19dB | 24 DL GAIN=-19dB |
| POWER PER CARRIER [dBm] NO LOAD CONDITION ON CARRIER 1 | 14 DL GAIN=-19dB | 24 DL GAIN=-19dB | 24 DL GAIN=-19dB | 24 DL GAIN=-19dB |
| POWER PER CARRIER [dBm] BOOSTING ON CARRIER 2, 3, AND 4 | 14 DL GAIN=-19dB | 25 DL GAIN=-18dB | 25 DL GAIN=-18dB | 25 DL GAIN=-18dB | ns
JOINT OPTIMIZATION OF A RADIO ACCESS NETWORK AND A DISTRIBUTED ANTENNA SYSTEM

CROSS-REFERENCE TO RELATED APPLICATION

This application is a continuation of U.S. patent application Ser. No. 15/811,445, filed Nov. 13, 2017, and titled "Joint Optimization of a Radio Access Network and a Distributed Antenna System," which is a continuation of U.S. patent application Ser. No. 15/431,263, filed Feb. 13, 2017, and titled "Joint Optimization of a Radio Access Network and a Distributed Antenna System," which is a continuation of U.S. patent application Ser. No. 14/760,402, filed Jul. 10, 2015, and titled "Joint Optimization of a Radio Access Network and a Distributed Antenna System," which is a U.S. national phase under 35 U.S.C. 371 of International Patent Application No. PCT/US2015/015999, titled "Joint Optimization of a Radio Access Network and a Distributed Antenna System," and filed Feb. 16, 2015, which claims priority to U.S. Provisional Application Ser. No. 61/942,800, filed Feb. 21, 2014, and titled "Jointly Managing the Operation and Configuration of Distributed Antenna Systems and Radio Access Network Systems," wherein the contents of all of the foregoing applications are hereby incorporated herein by reference.

TECHNICAL FIELD

The disclosure relates generally to telecommunications and, more particularly (although not necessarily exclusively), to joint management and optimization of a radio access network and a distributed antenna system.

BACKGROUND

A distributed antenna system (DAS) can include one or more head-end units and multiple remote units coupled to each head-end unit. A DAS can be used to extend wireless coverage in an area. Head-end units can be connected to one or more base stations of a radio access network (RAN). Each base station can be part of a separate node of the RAN. A head-end unit can receive downlink signals from the base station and distribute downlink signals in analog or digital format to one or more remote units. The remote units can transmit the downlink signals to user equipment devices within coverage areas serviced by the remote units. In the uplink direction, signals from user equipment devices may be received by the remote units. The remote units can transmit the uplink signals received from user equipment devices to a head-end unit. The head-end unit can transmit uplink signals to the serving base stations. The DAS may thus provide coverage extension for communication signals from the RAN nodes.

The RAN and DAS may be separately managed and optimized via respective operations and management self-optimizing network (SON) units. A DAS SON unit, for example, can use parameters and counters specific to the DAS. The DAS SON unit can be fully separated from the RAN equipment. The result of a separate DAS SON unit from RAN equipment is that any modification to the configuration of the RAN nodes can have an unexpected impact on the operation of the DAS. Similarly, any modification to the configuration of the DAS can have an unexpected impact on the RAN nodes. RAN and DAS system optimization cannot be jointly performed on DAS and RAN nodes with a DAS SON unit separated from the RAN nodes.

SUMMARY

In one aspect, a method is provided. The method can include collecting, from a radio access network, a first set of operations and management parameters. The method can also include collecting, from a distributed antenna system, a second set of operations and management parameters. The method can further include determining, by a processing device, target operations and management parameters for jointly optimizing the radio access network and the distributed antenna system. The method can also include jointly optimizing the radio access network and the distributed antenna system based on the first set of operations and management parameters, the second set of operations and management parameters, and the target operations and management parameters.

In another aspect, a joint radio access network-distributed antenna system-self-optimizing network (RAN-DAS-SON) entity is provided. The joint RAN-DAS-SON entity can include first operations and management interface configured to receive a first set of operations and management parameters from one or more nodes of a radio access network. The joint RAN-DAS-SON entity can also include a second operations and management interface configured to receive a second set of operations and management parameters from a head-end unit of a distributed antenna system. The joint RAN-DAS-SON entity can further include an analysis module configured to determine target operations and management parameters for the radio access network and the distributed antenna system. The analysis module can also jointly optimize the radio access network and the distributed antenna system based on the first set of operations and management parameters, the second set of operations and management parameters, and the target operations and management parameters.

In another aspect, joint radio access network-distributed antenna system-self-optimizing network (RAN-DAS-SON) entity is provided. The joint RAN-DAS-SON entity can include a first operations and management interface configured to receive a first set of operations and management parameters from one or more nodes of a radio access network. The joint RAN-DAS-SON entity can also include a second operations and management interface configured to receive a second set of operations and management parameters from a head-end unit of a distributed antenna system. The joint RAN-DAS-SON entity can further include a processing device. The joint RAN-DAS-SON entity can also include a memory device having program code stored thereon. Upon execution by the processing device, the program code is configured to perform operations comprising determining target operations and management parameters for the radio access network and the distributed antenna system.

BRIEF DESCRIPTION OF THE DRAWINGS

FIGS. 4A-4B are tables depicting examples of power allocation and re-allocation across downlink carrier signals from RAN nodes and a remote unit according to one aspect of the present disclosure.

DETAILED DESCRIPTION

Figure 1:
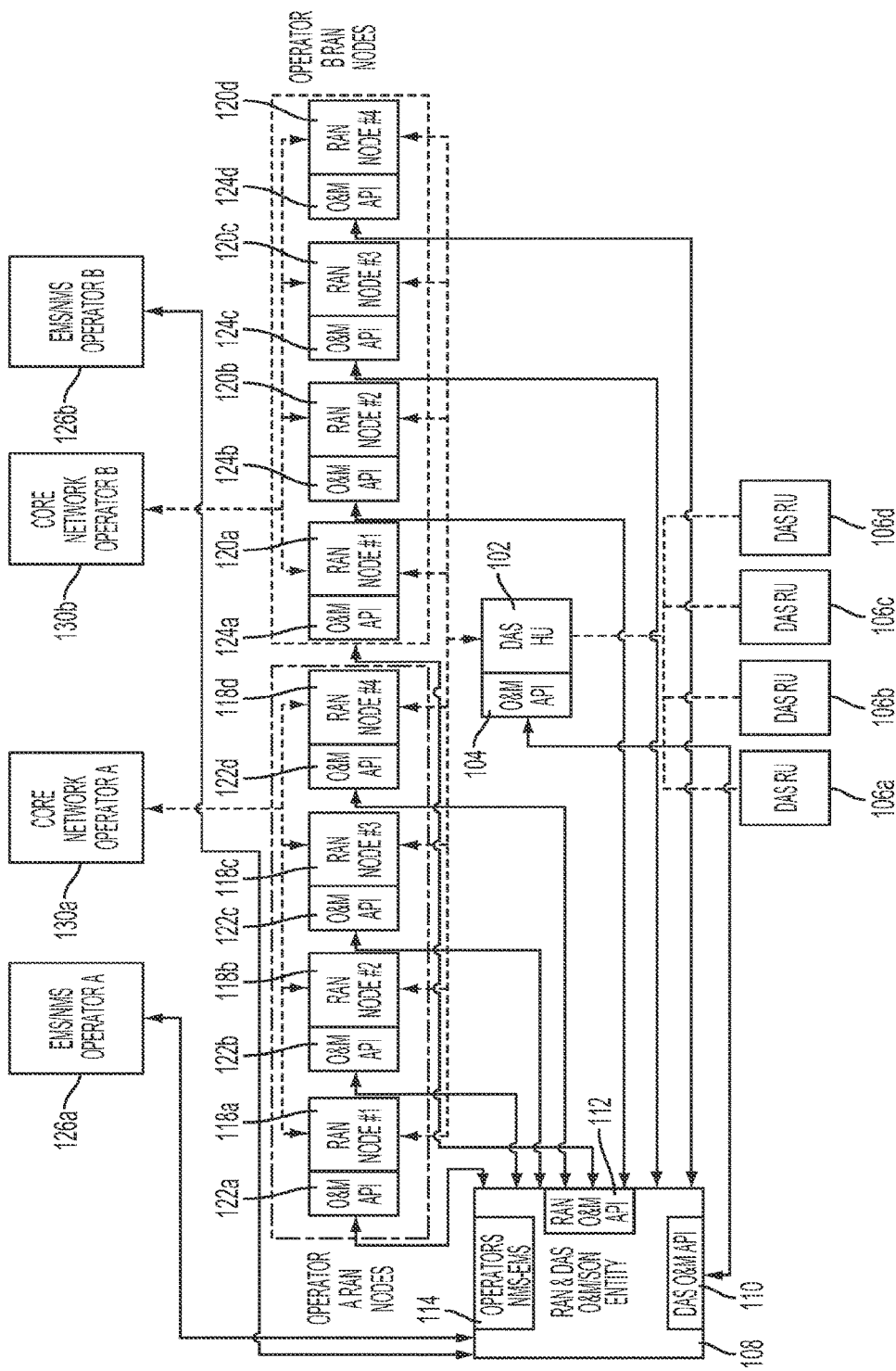
FIG. 1 is a block diagram of an example of a radio access network (RAN) and distributed antenna system (DAS) architecture according to one aspect of the present disclosure

Certain aspects and features are directed to methods and systems for jointly managing and optimizing the operation and configuration of a distributed antenna system (DAS) and a radio access network (RAN). For example, a joint RAN-DAS self-optimizing network (SON) entity can be communicatively coupled to the DAS head-end unit and one or more nodes of the RAN. The joint RAN-DAS-SON entity can receive operations and management (O&M) parameters specific to the RAN and O&M parameters specific to the DAS. Based on the DAS O&M parameters and RAN O&M parameters, the joint RAN-DAS-SON entity can determine target values for O&M parameters, which can indicate optimal optimization settings for the RAN and DAS. For example, the optimal optimization settings can include settings to tune the RAN and DAS for optimal coverage, capacity, or performance. In some aspects, optimization settings can include adjustments for the uplink/downlink gain of signals transmitted by the RAN or DAS to compensate for detected noise within the RAN and DAS. In other aspects, optimization settings can include re-allocating power levels of downlink signals transmitted by RAN nodes to account for changing traffic conditions. Other settings to tune the RAN and DAS for optimal coverage, capacity, or performance are also possible.

Jointly optimizing the RAN and a DAS through a joint RAN-DAS-SON entity can facilitate communication between RAN nodes and DAS head-end units and reduce delays caused by measuring and sending performance data between the DAS and the RAN. For example, without a joint RAN-DAS-SON entity, a base station in a RAN can compensate for uplink noise generated by the DAS by measuring for uplink noise offline first, and then separately adjusting uplink/downlink gain to compensate for the uplink noise through the O&M system of the base station. A joint RAN-DAS-SON entity can receive performance indicators indicating uplink noise level from the RAN and DAS and in response send instructions to the DAS head-end unit to modify the uplink gain or a DAS node to modify the downlink gain. Similarly, the joint RAN-DAS-SON entity can adjust for signal delay introduced by the DAS.

For example, the DAS can measure value of the delay introduced between the head end and the remote unit in both downlink and the uplink directions. This value can be reported to the joint RAN-DAS-SON entity which in turn can send an O&M command to the base station (i.e. the RAN Node). This command can be the Cell Radius O&M parameter used in the base station to configure the maximum expected delay in the cell served. The optimal value of the Cell Radius parameter can be calculated by the SON entity as follows:

> [DAS roundtrip (downlink+uplink) delay+estimated over-the-air roundtrip delay (due to propagation over max distance between the remote unit and user terminal)]*Light Speed/2. This formula is valid by assuming total DL delay=total UL delay.

Jointly optimizing the RAN and DAS through a joint RAN-DAS-SON entity can also make performance data of the RAN available to the DAS. The joint RAN-DAS-SON entity can detect changes to RAN performance data and make corresponding optimizations to DAS settings to tune the DAS to optimal performance characteristics.

These illustrative aspects and examples are given to introduce the reader to the general subject matter discussed here and are not intended to limit the scope of the disclosed concepts. The following sections describe various additional features and examples with reference to the drawings in which like numerals indicate like elements, and directional descriptions may be used to describe the illustrative aspects but, like the illustrative aspects, should not be used to limit the present disclosure.

FIG. 1 is a logical block diagram depicting an example of a RAN-DAS architecture with a joint RAN-DAS-SON entity suitable for implementing the subject matter described herein. The RAN-DAS architecture can include a DAS with remote units 106a-d (each remote unit labeled "DAS RU" in FIG. 1) communicatively coupled to a DAS head-end unit 102. The head-end unit 102 can include an O&M application programming interface (API) 104, which can be used to provide DAS O&M parameters to a joint RAN-DAS-SON entity 108. Non-limiting examples of DAS O&M parameters can include downlink/uplink gain settings, frequency allocations, sector mapping settings, maximum input/output power levels, temperature controls, and measured interference levels.

The RAN-DAS architecture can also include a RAN with multiple operators. Each operator can have multiple RAN nodes associated with multiple technologies, sector identifiers, and carrier frequencies. As shown in FIG. 1, RAN operator A can include RAN nodes 118a-d communicatively coupled to a core network 130a for operator A. RAN nodes 118a-d can each include an O&M API 122a-d for communicating RAN O&M parameters with the joint RAN-DAS-SON entity 108. Non-limiting examples of RAN O&M parameters can include base station software stack control and monitoring parameters, radio front end processing parameters, media access control scheduler settings, radio resource management settings, and transport plane settings. RAN operator A can also include an element management system (EMS)/network management system (NMS) entity 126a communicatively coupled to the joint RAN-DAS-SON entity 108. Similarly, RAN operator B can include RAN nodes 120a-d communicatively coupled to a core network 130b for operator B. RAN nodes 120a-d can also include O&M APIs 124a-d for communicating RAN O&M parameters to the joint RAN-DAS-SON entity 108. RAN operator B can also include an EMS/NMS entity 126b communicatively coupled to the joint RAN-DAS-SON entity 108. While FIG. 1 depicts joint RAN-DAS SON entity 108 separate from the RAN and DAS for illustrative purposes, in other aspects, the joint RAN-DAS SON entity 108 can be included in one of the RAN nodes 118a-d, 120a-d or in the head-end unit 102.

The EMS/NMS entities 126a-b can include an EMS and an NMS specific to each respective operator. The EMS/NMS entities 126a-b can manage network elements of the respective operator networks. For example, EMS/NMS entities 126a-b can manage network administration tasks, identify network issues within the respective RAN, and manage the capacity of the RAN and identify areas of data congestion within each respective RAN. Each of the RAN nodes 118a-d and 120a-d can include a base station for providing downlink communications to the DAS head-end unit 102. The base stations of each respective RAN node 118a-d and 120a-d can also receive uplink communications from the head-end unit 102 and provide the uplink communications to respective core networks 130a-b.

The joint RAN-DAS-SON entity 108 can receive RAN O&M parameters from RAN nodes 118a-d, 120a-d via a RAN O&M API 112. The joint RAN-DAS-SON entity 108 can also receive DAS O&M parameters via a DAS O&M API 110. The joint RAN-DAS-SON entity 108 can also receive communications from the EMS/NMS entities 126a-b via an EMS/NMS interface 114. In some aspects, the joint RAN-DAS-SON entity 108 can receive EMS/NMS commands directly from RAN nodes 118a-d and 120a-d.

Based on the received RAN O&M parameters and DAS O&M parameters, the joint RAN-DAS-SON entity 108 can determine target O&M parameters for optimal configuration of elements of the RAN and DAS. Target O&M parameters can include various parameters for jointly optimizing the RAN and DAS. The target O&M parameters can include optimal configuration settings to optimize coverage characteristics, capacity characteristics, or performance characteristics of the RAN and DAS. For example, each of the RAN operators can have different key performance indicators that specify target performance guidelines such as network capacity requirements and minimum quality of service requirements. Each operator can adopt a specific policy on the visible/configurable parameters. In one aspect, the target O&M parameters determined by the joint RAN-DAS-SON entity 108 can be provided to the DAS head-end unit 102 and the individual RAN nodes 118a-d, 120a-d to modify RAN and DAS system parameters to ensure that the key performance indicators of the different operators are met. Further, the joint RAN-DAS-SON entity 108 can jointly manage the RAN and DAS to minimize the impact on one operator network (e.g., RAN nodes 120a-d) due to configuration changes in the other operator network (e.g, RAN nodes 118a-d). Further, the joint RAN-DAS-SON entity 108 can modify parameters specific to the DAS head-end unit 102 in order to optimize the DAS due to changes in the RAN configuration. Parameters specific to the head-end unit 102 that can be adjusted include the gain of signals transmitted by the head-end unit 102.

In some aspects, target O&M parameters jointly configured by the joint RAN-DAS-SON entity 108 can include values to adjust the uplink gain of the DAS head-end unit 102. For example, the uplink noise from a RAN node 118 can be used as a reference parameter to adjust the DAS uplink gain. The DAS head-end unit 102 can report the generated uplink noise power at the input port of the RAN node 118, and the joint RAN-DAS-SON entity 108 can adjust the uplink gain of the DAS head-end unit 102 based on the uplink noise power reference of the RAN node 118. If the head-end unit 102 uplink noise power exceeds the uplink noise power reference of the RAN node 118 by x dB due to the current DAS head-end unit 102 uplink gain, then the joint RAN-DAS-SON entity 108 can reduce the head-end unit 102 UL gain by x dB.

Another RAN O&M parameter that the joint RAN-DAS-SON entity 108 can use to optimize the DAS head-end unit 102 uplink gain is the P0nom target parameter of the RAN Node 118. In the LTE wireless communication standard, the P0nom target parameter corresponds to the reference uplink nominal power. A target power level at the input of a DAS remote 106 can also be defined and available at the joint RAN-DAS-SON entity 108. The joint RAN-DAS-SON entity 108 can set the uplink gain of the DAS head-end unit 102 so that:

target DAS remote unit input power+DAS head-end unit uplink gain=P0nom target

In another aspect, the target uplink signal to interference-plus-noise ratio (SINR) of the RAN node 118 can be used by the joint RAN-DAS-SON entity 108 in order to optimize the number of DAS remote units 106 connected to the same RAN node 118 (i.e. the same sector). The number of remote units 106 connected to the same RAN node 118 is a target O&M parameter that can be referred to as the DAS simulcast factor. If the target uplink SINR of the RAN node 118 cannot be met due to excessive uplink noise from the DAS, the joint RAN-DAS-SON entity 108 can reduce the DAS simulcast factor and send a command to the DAS head-end unit 102 instructing the head-end unit 102 to reduce the DAS simulcast factor.

For example, if the target uplink SI NR is equal to x dB, and the current uplink SINR is equal to x−3 dB, then the joint RAN-DAS-SON entity 108 can instruct the DAS head-end unit 102 to reduce the simulcast factor by half (i.e. to reduce by half the number of remote units 106 connected to the same sector). Reducing the DAS simulcast factor by half can increase the uplink SINR of the RAN node 118 by 3 dB and meet the target.

In additional aspects, the RAN O&M parameter indicating the number of active antennas of the RAN node 118 can be used by the joint RAN-DAS-SON entity 108 to optimize the number of active DAS remote units 106. If the RAN node 118 reports that a secondary antenna port (e.g. in case of a 2×2 MIMO configuration) is not active, then the joint RAN-DAS-SON entity 108 can instruct the DAS head-end unit 102 to shut down the DAS remote units 106a-d communicatively linked to the secondary antenna port of the RAN node 118. In addition to shutting down the DAS remote units 106a-d communicatively linked to the secondary antenna port, the DS head-end unit 102 can also shut down any other DAS module related to the secondary radio path.

In additional aspects, the target O&M parameter that the joint RAN-DAS-SON entity 108 can configure includes values to adjust the downlink gain of the head-end unit 102. For example, the RAN node 118 can report the transmission output power of the RAN node 118 for a given carrier to the joint RAN-DAS-SON entity 108. The joint RAN-DAS-SON entity 108 can also obtain information from the RAN node 118 regarding the desired target power for the given carrier as transmitted by the DAS remote unit 106. The joint RAN-DAS-SON entity 108 can configure the DAS head-end unit 102 downlink gain in order to reach the target output power level at the remote unit 106 as follows:

target DAS remote unit output power=RAN node transmission power+DAS downlink gain.

The joint RAN-DAS SON entity 108 can also configure the DAS head-end unit 102 downlink gain based on the output power and target output power of a pilot signal. For example, the RAN node 118 can also report to the joint RAN-DAS-SON entity 108 the output power of the pilot signal from the RAN node 118. The DAS head-end unit 102 can report the target output pilot power at the DAS remote unit 106. The joint RAN-DAS SON entity 108 can configure the DAS head-end unit 102 downlink gain according to the same formula above. In some aspects, the optimal setting for the DAS head-end unit 102 downlink gain can also be a negative value, in which case the joint RAN-DAS SON entity 108 can attenuate the downlink gain of the head-end unit 102.

In other aspects, the Low Noise Amplifier (LNA) gain in the uplink path of the RAN node 118 can be reported to the joint RAN-DAS SON entity 108. In order to optimize the uplink path performance of the RAN and DAS combined system, the joint RAN-DAS SON entity 108 can switch off the LNA of the RAN node 118 and set the uplink gain of the DAS head-end unit 102 equal to the gain of the LNA of the RAN node 118. In some aspects, a Tower Mounted Amplifier (TMA) gain setting may be available at the RAN node 118. The joint RAN-DAS SON entity 108 can set the uplink gain of the TMA of the RAN node 118 to a value equal to:

uplink noise rise at the RAN node due to the DAS+ (uplink-downlink) gain imbalance of the DAS In additional aspects, the RAN node 118 can report to the joint RAN-DAS SON entity 108 information related to the frequency, technology, channel bandwidth, Mobile Country Code, Mobile Network Code of the radiated cell signals, including other information the RAN node 118 may broadcast to the network. The joint RAN-DAS SON entity 108 can relay this information to the DAS head-end unit 102, and to the DAS controller within the head-end unit 102 more specifically.

The RAN node 118 can also provide RAN O&M parameters including information indicating the current Transmission Mode (TM) to the joint RAN-DAS SON entity 108. For example, the TM can correspond to various antenna transmission configurations including SISO, MIMO TX Diversity, or MIMO Spatial Multiplexing (open loop or closed loop). If the RAN node 118 operates in a closed loop TM, then the RAN node 118 also may also provide the Precoding Matrix Indicator (PMI) in operation, which depends on the type of phase shift (e.g., +−90, +−180 degrees, or others) the RAN node 118 applies to the transmitted signals. The joint RAN-DAS SON entity 108 can report the parameters including the TM and the PMI to the DAS head-end unit 102, and to the DAS controller more specifically. The DAS head-end unit 102 can apply another phase-shift to the received signals according to the phase shift applied by the RAN node 118. By coherent combining o the phase shifted signals at the DAS head-end unit 102, the desired signal strength can be maximized and the undesired signals can be canceled.

In additional aspects, the traffic load on a given cell can be also reported by the RAN node 118 to the joint RAN-DAS SON entity 108. In case the reported traffic load is higher than a given threshold for a given DAS simulcast configuration (i.e. the number of DAS remote units 106 radiating the same cell signal), then the joint RAN-DAS SON entity 108 can instruct the DAS head-end unit 102 to reduce the DAS simulcast factor (e.g., assign fewer remote units to the same cell signal). The DAS head-end unit 102 can use a signal switching function to route the cell signal to different remote units 106.

In another aspect, instead of determining the target O&M parameters, the joint RAN-DAS-SON entity 108 can operate in a "slave" mode by forwarding RAN O&M parameters and DAS O&M parameters to the EMS/NMS entities 126a-b. The EMS/NMS entities a-b can determine optimal configuration settings for the RAN and DAS and provide instructions on the configuration settings to the joint RAN-DAS-SON entity 108. Using the instructions from the EMS/NMS entities 126a-b, the joint RAN-DAS-SON entity 108 can optimize the RAN and DAS to optimize coverage characteristics, capacity characteristics, or performance characteristics.

Figure 2:
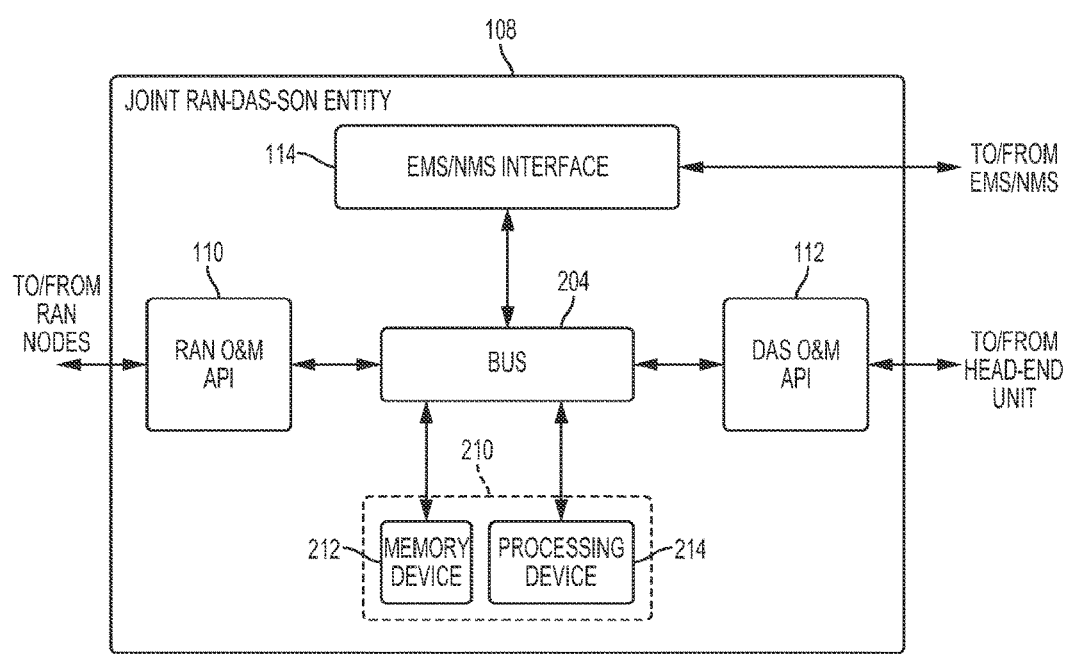
FIG. 2 is a block diagram of an example of a joint RAN-DAS self-optimizing network (SON) entity according to one aspect of the present disclosure.

FIG. 2 is a block diagram depicting an example of a joint RAN-DAS-SON entity 108 according to one aspect. The joint RAN-DAS-SON entity 108 can include a system bus 204 that can communicatively couple an analysis module 210 with the RAN O&M API 112, and a DAS O&M API 110.

The analysis module 210 can include a processing device 214 and a memory device 212. The processing device 214 can include any device suitable for executing program instructions to control operation of the joint RAN-DAS-SON entity 108. Examples of processing device 214 include a microprocessor, an application-specific integrated circuit ("ASIC"), a field-programmable gate array ("FPGA"), or other suitable processor. The processing device 214 may include one processor or any number of processors. The memory device 212 can include any non-transitory media for storing program code defining the operations of the joint RAN-DAS-SON entity 108. Non-limiting examples of memory device 212 can include read-only memory (ROM), random-access memory (RAM), optical storage, magnetic storage, flash memory, or any other medium from which the processing device 214 can read program code.

Figure 3:
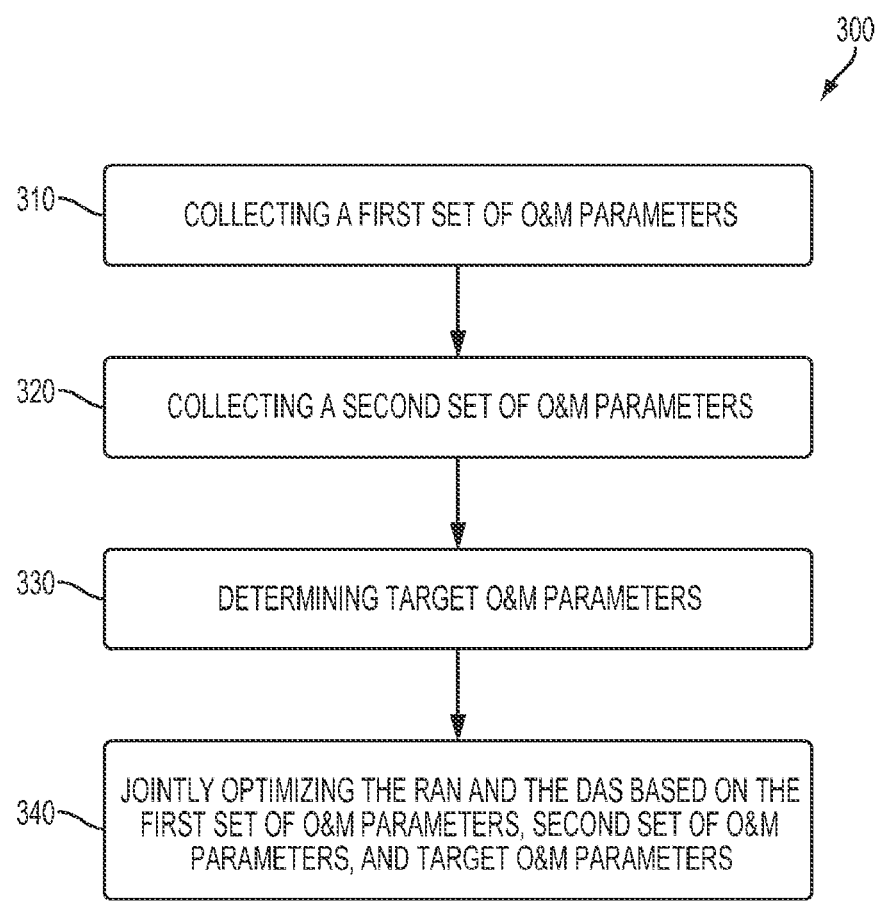
FIG. 3 is a flowchart depicting a process for jointly optimizing a RAN and a DAS according to one aspect of the present disclosure.

The memory device 212 can include program code defining instructions that, when executed by the processing device 214, cause the joint RAN-DAS-SON entity 108 to switch between a "master" mode, a "slave" mode, and a "hybrid" mode. While operating in a "master" mode, the joint RAN-DAS-SON entity 108 can determine target O&M parameters based on received DAS O&M parameters and RAN O&M parameters. The target O&M parameters can be provided as instructions to the appropriate RAN nodes 118a-d, 120a-d or DAS head-end unit 102. While operating in a "slave" mode, the joint RAN-DAS-SON entity 108 can forward DAS O&M parameters and RAN O&M parameters to EMS/NMS entities 126a-b. The joint RAN-DAS-SON entity 108 can also forward instructions on optimal configuration received from the EMS/NMS entities 126a-b to RAN nodes 118a-d, 120a-d, and to DAS head-end unit 102 via the RAN O&M API 110 and the DAS O&M API 112, respectively. In a "hybrid" mode, a portion of the O&M target parameters can be determined by the joint RAN-DAS-SON entity 108 and a second portion of the O&M target parameters can be determined by the EMS/NMS entities 126a-b and forwarded to the appropriate RAN nodes 118a-d, 120a-d or DAS head-end unit 102. In some aspects, each operator of the RAN can specify different optimization algorithms for the joint RAN-DAS-SON entity 108. In this context, each operator can select which target O&M parameters should be determined at the joint RAN-DAS-SON entity 108 and which target O&M parameters can be centrally managed at the EMS/NMS entities 126a-b FIG. 3 is a flowchart depicting a process 300 for jointly optimizing a RAN and DAS architecture based on collected O&M parameters. In block 310, the joint RAN-DAS-SON entity 108 can collect a first set of O&M parameters. For example, the joint RAN-DAS-SON entity 108 can collect RAN O&M parameters from each of the RAN nodes 118a-d, 120a-d via the RAN O&M API 112 included in the joint RAN-DAS-SON entity 108. In some aspects, the joint RAN-DAS-SON entity 108 can request each RAN node 118a-d, 120a-d to a set of RAN O&M parameters at a particular point in time. In other aspects, each base station in the RAN nodes 118a-d, 120a-d can periodically transmit measured RAN O&M parameters to the joint RAN-DAS-SON entity 108. As mentioned above, RAN O&M parameters from a particular RAN node 118a can include various control parameters specific to the operator for the RAN node 118a.

In block 320, the joint RAN-DAS-SON entity 108 can collect a second set of O&M parameters. For example, the joint RAN-DAS-SON entity 108 can collect DAS O&M parameters from the DAS head-end unit 102 similar to the steps described with respect to block 310. As mentioned above, DAS O&M parameters can include control and signaling parameters specific to the DAS.

The joint RAN-DAS-SON entity 108 can determine target O&M parameters based on the first set of O&M parameters and the second set of O&M parameters, as shown in block 330. Target O&M parameters can include optimal configuration settings for jointly configuring the RAN and the DAS. For example, the first set of O&M parameters (e.g., RAN O&M parameters) may include key performance indicators indicating network performance guidelines and minimum quality of service requirements. The joint RAN-DAS-SON entity 108 can determine the target O&M parameters that would meet the performance guidelines specified by the key performance indicators. As another example, the first set of O&M parameters can indicate measured uplink noise detected by base stations at RAN nodes 118a-d, 120a-d. In response, the joint RAN-DAS-SON entity 108, via the analysis module 210, can determine target O&M parameters to compensate for the uplink noise. Target O&M parameters to compensate for uplink noise can include instructions for increased gain at the head-end unit 102. Similarly, the joint RAN-DAS-SON entity 108 can determine target O&M parameters and provide instructions to the base stations at RAN nodes 118a-d, 120a-d to adjust downlink gain to compensate for downlink noise measured at the head-end unit 102.

In another aspect, the joint RAN-DAS-SON entity 108 can be configured to operate in a "slave" mode and forward the first set of O&M parameters and second set of O&M parameters to the EMS/NMS entities 126a-b. The EMS/NMS entities 126a-b can determine the target O&M parameters and generate instructions regarding optimizing the RAN and DAS to meet the target O&M parameters.

Based on the first set of O&M parameters, second set of O&M parameters, and the target O&M parameters, the joint RAN-DAS-SON entity 108 can jointly optimize the RAN and the DAS, as indicated in block 340. For example, while the joint RAN-DAS-SON entity 108 operates in a "master" mode, the analysis module 210 can determine instructions for optimizing characteristics of the RAN and DAS to obtain the target O&M parameters. The joint RAN-DAS-SON entity 108 can provide the instructions regarding the target O&M parameters to the RAN nodes 118a-d, 120a-d to optimize aspects of the RAN. The joint RAN-DAS-SON entity 108 can also provide the instructions regarding the target configuration settings to the DAS head-end unit 102 to optimize aspects of the DAS. As discussed above, jointly optimizing the RAN and the DAS can improve the capacity characteristics, coverage characteristics, or the performance characteristics of the RAN and DAS. When the joint RAN-DAS-SON entity 108 operates in a "slave" mode, the joint RAN-DAS-SON entity 108 can jointly optimize the RAN and DAS by forwarding instructions from the EMS/NMS entities 126a-b to the RAN nodes 118a-d, 120a-d and the head-end unit 102.

Optimizing the RAN and DAS by Re-allocating Power Levels of Downlink Carrier Signals In some aspects, the joint RAN-DAS-SON entity 108 can optimize the RAN and DAS by re-allocating power levels across downlink carriers based on low traffic conditions detected on one or more downlink carriers. For example, RAN nodes 118a-d, 120a-d can each transmit a different downlink carrier signal at varying power levels defined during initialization of the DAS. The power levels of the individual downlink carrier signals can be independently calculated to meet specific key performance indicators for remote units 106a-d. For example, key performance indicators for remote units 106a-d may specify that the downlink carrier signals are transmitted at a minimum pilot power level. Each remote unit 106a-d can transmit the multiple carrier signals to user devices.

During operation of the RAN and DAS, however, low traffic conditions may exist for one or more of the downlink carrier signals, such that some of the allocated power is unused. Low traffic conditions can thus result in inefficient power distribution due to unused bandwidth. When a given downlink carrier signal is associated with a low traffic load, the joint RAN-DAS-SON entity 108 can re-distribute the power allocation across the downlink carriers to optimize the RAN and DAS.

For example, FIGS. 4A and 4B are tables depicting an example of power allocation and re-allocation across four downlink carrier signals from RAN nodes 118a-d and remote unit 106. FIG. 4A depicts the power level per downlink carrier signal provided by RAN nodes 118a-d, each RAN node 118a-d respectively transmitting one carrier signal 402a-d. During initialization of the RAN and DAS, initial power allocation for the signals transmitted by RAN nodes 118a-d can be evenly divided as shown in row 404, each RAN node 118a-d transmitting 43 decibel-milliwatts (dBm) when transmitting for full traffic load. During operation of the RAN and DAS, one carrier signal 402a may exhibit no traffic load, in which case RAN node 118a can transmit carrier signal 402a at a reduced power level of 33 dBm.

FIG. 4B depicts a table showing example power levels of the downlink carrier signals 402a-d transmitted by remote unit 106. Row 406 depicts power level per carrier signal as transmitted by remote unit 106 upon initialization of the RAN and DAS. As in FIG. 4A, initial power allocation for signals transmitted by remote unit 106 can be evenly divided, remote unit 106 transmitting all four carrier signals 402a-d at 24 dBm. Row 406 also indicates that the remote unit 106 applies a downlink gain of −19 dB to each carrier signal 402a-d. Row 408 depicts the power level per carrier signal as transmitted by remote unit 106 when there is no traffic load on carrier signal 402a. Carrier signal 402a can be transmitted at a power level of 14 dBm, while carrier signals 402b-d may be transmitted at power levels of 24 dBm. Without any optimization of the RAN and DAS, the remote unit 106 can continue to apply a downlink gain of −19 dB to each carrier signal 402a-d. Row 410 depicts the power level per carrier signal as transmitted by remote unit 106 after the joint RAN-DAS-SON entity 108 optimizes the RAN and DAS by boosting the power levels of downlink carrier signals with a minimum traffic load. Due to the low traffic conditions of carrier signal 402a, the excess downlink power can be re-distributed and applied to carrier signals 402b-d. The joint RAN-DAS-SON entity 108 can calculate a 1 dB gain boost for each of the carrier signals 402b-d. Upon applying the boosting factor, while carrier signal 402a (with no traffic load) is transmitted at a power level of 14 dBm (−19 dB gain), power levels of carrier signals 402b-d can each increase to 25 dBm (−18 dB gain). The composite power of the remote unit 106 remains constant.

In some aspects, the joint RAN-DAS-SON entity 108 can receive the traffic load information on each downlink carrier signal and optimize the transmission power levels of remote units based on the traffic load information. For example, the joint RAN-DAS-SON entity 108 can receive traffic load information as part of RAN O&M parameters received from RAN nodes 118*a-d*, 120*a-d*. One non-limiting example of traffic load information is information indicating the number of user devices connected to and in communication with RAN nodes 118*a-d*, 120*a-d*. Another example of traffic load information is information indicating the amount of bandwidth of the total signal bandwidth used by user devices connected to and in communication with RAN nodes 118*a-d*, 120*a-d*. The DAS head-end unit 102 can also receive traffic load information from the RAN nodes 118*a-d*, 120*a-d* and provide the traffic load information to the joint RAN-DAS-SON entity 108 as part of DAS O&M parameters. The DAS head-end unit 102 can also measure the traffic load information by demodulating each received downlink signal from RAN nodes 118*a-d*, 120*a-d* and provide the traffic load information to the joint RAN-DAS-SON entity 108.

The traffic load information can indicate to the joint RAN-DAS-SON entity 108 the traffic load on each downlink carrier from RAN nodes 118*a-d*, 120*a-d*. Based on the traffic load information, the joint RAN-DAS-SON entity 108 can determine target operations and management parameters for optimizing the RAN and DAS by re-allocating excess signal power to other downlink carriers. For example, for any downlink carrier signal that has a traffic load less than a predefined threshold, the joint RAN-DAS-SON entity 108 can calculate the power headroom available for the carrier signal (e.g., the amount of allocated power that is unused due to the low load traffic conditions). The power headroom for a given carrier signal can be the difference between the maximum possible power of a carrier signal and the actual power transmitted by a remote unit 106 to provide wireless communication to connected user devices.

The joint RAN-DAS-SON entity 108 can allocate the measured power headroom available for the low threshold carrier signal to the other carrier signals transmitted by the remote unit 106. For example, based on the calculated power headroom, the joint RAN-DAS-SON entity 108 can determine a boosting factor to apply to the carrier signals associated with traffic loads higher than the predefined threshold transmitted by the remote unit 106. The boosting factor can include the amount of downlink gain to apply to each of the carrier signals with higher traffic load. In some aspects, target operations and management parameters determined by the joint RAN-DAS-SON entity 108 can include the boosting factor. The joint RAN-DAS-SON entity 108 can optimize the RAN and DAS by providing the boosting factor to the head-end unit 102. The head-end unit 102 can provide the boosting factor to the appropriate remote unit 106, which can amplify the downlink gain associated with the carrier signals with higher traffic load according to the amount of the boosting factor. In other aspects, the joint RAN-DAS-SON entity 108 can optimize the RAN and DAS by directly instructing the appropriate remote unit 106 to amplify downlink gain associated with the carrier signals with higher traffic load according to the amount of the boosting factor.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof can be apparent to those skilled in the art without departing from the scope of this invention. The illustrative examples described above are given to introduce the reader to the general subject matter discussed here and are not intended to limit the scope of the disclosed concepts.

What is claimed is:

1. A joint radio access network-distributed antenna system-self-optimizing network (RAN-DAS-SON) entity, comprising:
    at least one first interface configured to receive a first set of parameters from one or more nodes of a first radio access network
    and a second set of parameters from one or more nodes of a second radio access network different from the first radio access network;
    a second interface configured to receive a third set of parameters from a unit of a distributed antenna system; and
    a processing device configured to:
        determine target parameters for the one or more nodes of the first radio access network, the one or more nodes of the second radio access network, and one or more nodes of the distributed antenna system based on the first set of parameters, the second set of parameters, and the third set of parameters; and
        provide instructions to adjust one or more configuration settings of at least one node of the distributed antenna, at least one node of the first radio access network, and at least one node of the second radio access network based on the target parameters.

2. The joint RAN-DAS-SON entity of claim 1, wherein the joint RAN-DAS-SON entity is configured to receive the first set of parameters, the second set of parameters, or the third set of parameters via an application programming interface.

3. The joint RAN-DAS-SON entity of claim 1, wherein the processing device is configured to determine the target parameters based on network capacity requirements and minimum quality of service requirements for the first radio access network and the second radio access network.

4. The joint RAN-DAS-SON entity of claim 3, wherein the network capacity requirements and minimum quality of service requirements for the first radio access network are different from the network capacity requirements and minimum quality of service requirements for the second radio access network.

5. The joint RAN-DAS-SON entity of claim 1, wherein the configuration settings of the at least one node of the first radio access network include at least one of:
    a cell radius parameter;
    a downlink gain of the node;
    an operational status of a low noise amplifier; and
    an uplink gain of a tower mounted amplifier.

6. The joint RAN-DAS-SON entity of claim 5, wherein the configuration settings of the head-end unit include at least one of:
    an uplink gain of the head-end unit;
    a downlink gain of the head-end unit;
    a simulcast factor for the distributed antenna system; and
    routing performed by the head-end unit.

7. The joint RAN-DAS-SON entity of claim 6, wherein the configuration settings of the head-end unit include at least one of:
    an uplink gain of the head-end unit;
    a downlink gain of the head-end unit;
    a simulcast factor for the distributed antenna system; and
    routing performed by the head-end unit.

8. A joint radio access network-distributed antenna system-self-optimizing network (RAN-DAS-SON) entity, comprising:
a first interface configured to receive a first set of parameters from one or more nodes of a radio access network;
a second interface configured to receive a second set of parameters from a unit of a distributed antenna system;
a third interface configured to communicate with an element management system/network management system (EMS/NMS) entity associated with the radio access network;
wherein the joint RAN-DAS-SON entity is configured to:
provide the first set of parameters and the second set of parameters to the EMS/NMS entity;
obtain target parameters for the one or more nodes of the first radio access network and target parameters for the one or more nodes of the distributed antenna system; and
provide instructions to adjust one or more configuration settings of at least one node of the distributed antenna or at least one node of the radio access network based on the target parameters for the one or more nodes of the first radio access network or the target parameters one or more nodes of the distributed antenna system.

9. The joint RAN-DAS-SON entity of claim 8, wherein the joint RAN-DAS-SON entity is configured to obtain the target parameters for the one or more nodes of the first radio access network and the target parameters for the one or more nodes of the distributed antenna system by determining the target parameters for the one or more nodes of the first radio access network and the target parameters for the one or more nodes of the distributed antenna system based on the first set of parameters and the second set of parameters.

10. The joint RAN-DAS-SON entity of claim 8, wherein the joint RAN-DAS-SON entity is configured to obtain the target parameters for the one or more nodes of the first radio access network and the target parameters for the one or more nodes of the distributed antenna system from the EMS/NMS entity, wherein the EMS/NMS entity is configured to determine the target parameters for the one or more nodes of the first radio access network and the target parameters for the one or more nodes of the distributed antenna system.

11. The joint RAN-DAS-SON entity of claim 8, wherein the joint RAN-DAS-SON entity is configured to obtain the target parameters for the one or more nodes of the first radio access network and the target parameters for the one or more nodes of the distributed antenna system by:
receiving a first subset of target parameters for the one or more nodes of the first radio access network or one or more nodes of the distributed antenna system from the EMS/NMS entity; and
determining a second subset of target parameters for the one or more nodes of the first radio access network or one or more nodes of the distributed antenna system based on the first set of parameters and the second set of parameters.

12. The joint RAN-DAS-SON entity of claim 11, wherein the first subset of target parameters and the second subset of target parameters are selected by an operator of the radio access network.

13. The joint RAN-DAS-SON entity of claim 8, wherein the joint RAN-DAS-SON entity is configured to receive the first set of parameters or the second set of parameters via an application programming interface.

14. A radio access network-distributed antenna system-self-optimizing network (RAN-DAS-SON) entity comprising:
a first interface configured to communicate with one or more nodes of a radio access network;
a second interface configured to communicate with a unit of a distributed antenna system comprising a head-end unit communicatively coupled to one or more remote antenna units, wherein the head-end unit of the distributed antenna system is communicatively coupled to the one or more nodes of the radio access network;
wherein the joint RAN-DAS-SON entity is configured to:
receive traffic load information for a plurality of carrier signals from the radio access network and/or the distributed antenna system;
determine target parameters for the radio access network and the distributed antenna system based on the traffic load information for the plurality of carrier signals; and
provide instructions to adjust one or more configuration settings for the one or more remote antenna units of the distributed antenna based on the target parameters.

15. The joint RAN-DAS-SON entity of claim 14, wherein the joint RAN-DAS-SON entity is configured to determine target parameters for the radio access network and the distributed antenna system by comparing the traffic load for each carrier signal of the plurality of carrier signals to a predefined threshold.

16. The joint RAN-DAS-SON entity of claim 15, wherein the joint RAN-DAS-SON entity is configured to determine a power headroom for a first carrier signal of the plurality of carrier signals in response to determining that the traffic load for the first carrier signal of the plurality of carrier signals is below the predefined threshold.

17. The joint RAN-DAS-SON entity of claim 16, wherein the joint RAN-DAS-SON entity is configured to allocate power from the first carrier signal of the plurality of carrier signals to other carrier signals of the plurality of carrier signals based on the power headroom.

18. The joint RAN-DAS-SON entity of claim 17, wherein a respective traffic load for each of the other carrier signals of the plurality of carrier signals is higher than the traffic load for the first carrier signal of the plurality of carrier signals.

19. The joint RAN-DAS-SON entity of claim 14, wherein the one or more configuration settings for the one or more remote antenna units of the distributed antenna include a downlink gain of the one or more remote antenna units.

20. The joint RAN-DAS-SON entity of claim 14, wherein the joint RAN-DAS-SON entity is configured to provide the instructions to the one or more remote antenna units directly or indirectly via the head-end unit.

* * * * *